United States Patent [19]

Gerroir et al.

[11] Patent Number: 5,747,577
[45] Date of Patent: May 5, 1998

[54] CONDUCTIVE PARTICLES CONTAINING CARBON BLACK AND PROCESSES FOR THE PREPARATION THEREOF

[75] Inventors: Paul J. Gerroir; Nancy Ann Listigovers, both of Oakville; Michael F. Cunningham, Georgetown; Thomas E. Enright, Whitby, all of Canada; John A. Creatura, Ontario, N.Y.

[73] Assignee: Xerox Corporation, Stamford, Conn.

[21] Appl. No.: 579,107

[22] Filed: Dec. 27, 1995

[51] Int. Cl.$^6$ .................. C08F 2/44; H01B 1/06
[52] U.S. Cl. .......... 524/458; 523/200; 523/201; 523/209; 252/502; 252/511; 252/512; 252/513; 252/518
[58] Field of Search .............. 524/458; 523/200, 523/201, 204; 252/511, 502, 512, 513, 518

[56] References Cited

U.S. PATENT DOCUMENTS

| | | | |
|---|---|---|---|
| 4,833,060 | 5/1989 | Nair et al. | 430/137 |
| 4,835,084 | 5/1989 | Nair et al. | 430/137 |
| 5,043,404 | 8/1991 | Mahabadi et al. | 526/323.1 |
| 5,236,629 | 8/1993 | Mahabadi et al. | 252/511 |
| 5,447,791 | 9/1995 | Cunningham et al. | 252/518 |
| 5,484,681 | 1/1996 | Cunningham et al. | 430/137 |

*Primary Examiner*—Paul R. Michl
*Assistant Examiner*—Olga Asinovsky
*Attorney, Agent, or Firm*—Oliff & Berridge; Eugene O. Palazzo

[57] ABSTRACT

Conductive polymeric particles can be formed by mixing a monomer, carbon black and a block copolymer, wherein the block copolymer contains an A block that is miscible with said monomer and a B block that anchors to the surface of the carbon black, such as polystyrene or a derivative of polystyrene. A polymerization initiator is added to the mixture and bulk polymerization is effected until about 5 to about 30 weight percent of the monomer has been polymerized. This partially polymerized product is then dispersed in water and further polymerized.

15 Claims, 2 Drawing Sheets

1 μm

CONDUCTIVE PARTICLES CONTAINING CARBON BLACK AND PROCESSES FOR THE PREPARATION THEREOF

BACKGROUND OF THE INVENTION

This invention is generally directed to conductive particles and processes for the preparation thereof. More specifically, the present invention relates to conductive particles containing a polymer matrix and a carbon black dispersion, wherein the carbon black is evenly distributed throughout the polymer matrix using a block copolymer that contains a polymer block that is miscible with the polymer matrix and a second block that anchors to the surface of the carbon black.

In electrostatographic imaging and related development processes, images are developed using a developer generally comprising colored toner particles and carrier particles. Carrier cores generally comprise metals, which are conductive or semiconductive materials. Polymeric materials are generally used to coat the surface of the metals and are usually insulating. Therefore, carrier particles coated completely with polymer or a mixture of polymers can lose their conductivity and become insulating. Although this is desired for some applications, other applications require the carriers to have specific conductivity properties. Conductive magnetic brush development systems, for example, require carrier particles that are conductive. Since the carrier polymer coating can also control the triboelectric charging properties of the carrier, a conductive carrier coating is needed to design carriers with the desired conductivity and triboelectrical properties. However, traditional conductive polymers are very costly, and are not suitable for preparing low cost coatings. Thus, a conductive polymer composite comprising a low cost polymer and a conductive filler, such as conductive carbon black, is considered a more suitable alternative.

The coating of metal materials, such as carrier beads, with a polymer is known and can be achieved by two general approaches, solution and powder coating. Solution coating of carriers using a polymer composite solution comprised of a polymer, a conductive filler and solvent can be utilized to prepare a conductive carrier. However, trapping of solvent in the solution coating adversely interferes with the use of the coated materials. For example, residual solvent trapped in the carrier coating reduces the carrier life and the release of the solvent in the developer housing can cause other problems due to the harmful effects of adsorbed solvent on various copying machine parts and the toxicity of solvent. Moreover, the solvent recovery operation involved in solution coating processes is costly.

The powder coating of metal surfaces such as the carrier cores can eliminate the need for solvents and, therefore, many of the problems associated with solution coating. However, powder coating requires polymer powder that is very small in size, for example less than one micron. Although several polymer powders with desired particle size are available for carrier powder coating, there is a need for very small conductive polymeric particles, particularly, submicron particles, containing a conductive filler distributed evenly throughout the particles.

The preparation of polymeric particles for powder coatings can be accomplished primarily by three methods, namely grinding or attrition, precipitation and in situ particle polymerization. In grinding or attrition processes, especially fluid energy milling, large polymeric particles or polymeric composite particles containing fillers are reduced to the size needed for powder coating, for example less than one micron. However, such processes are often not desirable both from an economic and functional viewpoint. These materials are difficult to grind, and therefore, grinding or attrition of the required materials for coating with present milling equipment is very costly due to very low processing yield, for example in the range of 5 to 10 weight percent.

Precipitation processes can also be used to prepare polymeric and polymeric composite particles. In one approach, the polymer solution is heated to above its melting temperature and then cooled to form particles. In another process, the polymer solution is precipitated using a nonsolvent or the polymer solution is spray dried to obtain polymeric and polymeric composite particles. With all of these precipitation processes, it has been difficult to achieve low cost and clean polymer particles, that is, for example, with no or substantially no impurities such as solvents or precipitants in the resulting polymer particles. Furthermore, it is also difficult to obtain particles with small particle size and narrow particle size distribution. It is also difficult to control filler distribution throughout each particle's polymer matrix.

Suspension polymerization can be utilized to prepare polymer particles and polymeric composite particles containing, for example, a conductive filler. The main advantage of suspension polymerization is that the product may easily be recovered. Therefore, such a process is considered economical. However, it is very difficult to prepare very small particles by suspension polymerization, for example having a size less than five microns, because the monomer droplets tend to coalesce during the polymerization process, especially in the initial stage of polymerization where the droplets are very sticky.

U.S. Pat. No. 4,835,084 discloses a method for preparing pigmented particles wherein high concentrations of silica powder are used in the aqueous phase to prevent coalescence of the particles. U.S. Pat. No. 4,833,060 discloses a process for the preparation of pigmented particles by dissolving polymer in a solvent that is immiscible with water and dispersing the solution that is formed thereby in an aqueous phase containing silica powder to prevent coalescence of the particles. However, the silica powder used in both of these processes is removed using KOH, which is costly, and residual KOH and silica materials left on the surface of the particles affect the charging properties of the particles. Moreover, the above processes do not teach the preparation of submicron conductive particles.

In in situ particle polymerization processes, polymer particles are prepared by using suspension, dispersion, emulsion and semisuspension polymerization processes. Although emulsion and dispersion polymerization processes can be utilized to prepare polymeric particles smaller than one micron by nucleation and growth, these processes do not readily enable synthesis of particles containing fillers such as conductive fillers. Conductive fillers, such as carbon blacks, are free radical polymerization inhibitors and thus tend to reduce the rate of polymerization in such processes.

U.S. Pat. No. 5,043,404, the disclosure of which is totally incorporated herein by reference, discloses a semisuspension polymerization process for the preparation of small polymeric particles that are comprised of a mixture of monomers or comonomers, a polymerization initiator, a crosslinking component and a chain transfer component, which are bulk polymerized until partial polymerization is accomplished. The resultant partially polymerized monomer or comonomers is dispersed in water containing a stabilizer component with, for example, a high shear mixer. Then, the resultant suspension is polymerized, followed by washing and drying the submicron polymeric particles. However, the patent does not disclose submicron conductive polymeric particles containing fillers.

U.S. Pat. No. 5,236,629 discloses a process for the preparation of submicron particles using the semisuspension polymerization process. However, when carbon black is used as a conductive filler with monomers that do not have a high affinity for the carbon surface, particularly methacrylates and acrylates, the carbon black dispersion tends to be poor because of the difficulty in (1) dispersing the carbon black uniformly into the monomer initially (prior to polymerization) and (2) maintaining a stable carbon black dispersion (i.e. preventing formation of aggregates and clusters) during polymerization. "Poor carbon black dispersion" means that (1) some of the submicron particles contain very little or no carbon black, and/or (2) the carbon black present in the particles is not uniformly distributed within the particle, but rather is present as clusters. Either condition results in lower conductivity than is achieved when the carbon black is distributed uniformly throughout the submicron polymeric particles.

U.S. Pat. No. 5,484,681 describes a process for the preparation of submicron conductive particles that uses a diblock copolymer to tailor the triboelectric charge of the particle. This is accomplished by selecting the two blocks such that they diffuse to the particle surface during polymerization and thus have a significant effect on charge. However, the application does not disclose improving carbon black dispersion.

Even or homogeneous distribution of fillers such as carbon black is not believed achievable with the prior art processes mentioned herein. In fact, in prior art processes, the conductive filler is agglomerated around some of the polymeric particles and many of the other polymeric particles contain little or no conductive filler. Therefore a need exists for a invention to enable preparation of submicron conductive particles with even carbon black dispersion.

SUMMARY OF THE INVENTION

The present invention is directed to a process for the preparation of conductive polymeric particles. The process comprises: (a) mixing a monomer, carbon black, and a block copolymer comprising an A block that is miscible with the monomer and a B block that anchors to the surface of the carbon black; (b) adding a polymerization initiator to the mixture; (c) effecting bulk polymerization until about 5 to about 30 weight % of the monomer has been polymerized; (d) dispersing the partially polymerized product in water; and (e) polymerizing the resulting dispersion.

The process of the present invention provides small, and preferably submicron, conductive particles comprising a polymer matrix of the monomer or monomers, carbon black, and the block copolymer. The block copolymer acts as a dispersant/stabilizer for carbon black in the monomer, and eventually in the polymer matrix, aiding the breakdown of carbon black aggregates and preventing their reflocculation. The A block of the block copolymer acts as a steric stabilizer, preventing reflocculation of the carbon black particles, and the B block acts as an anchoring group attaching itself to the surface of the carbon black. As a result, the polymeric particles display very uniform carbon black dispersion, free of large aggregates and pigmentless particles. These conductive particles can be used to form coated carrier particles.

DETAILED DESCRIPTION OF THE INVENTION

Figure 1:
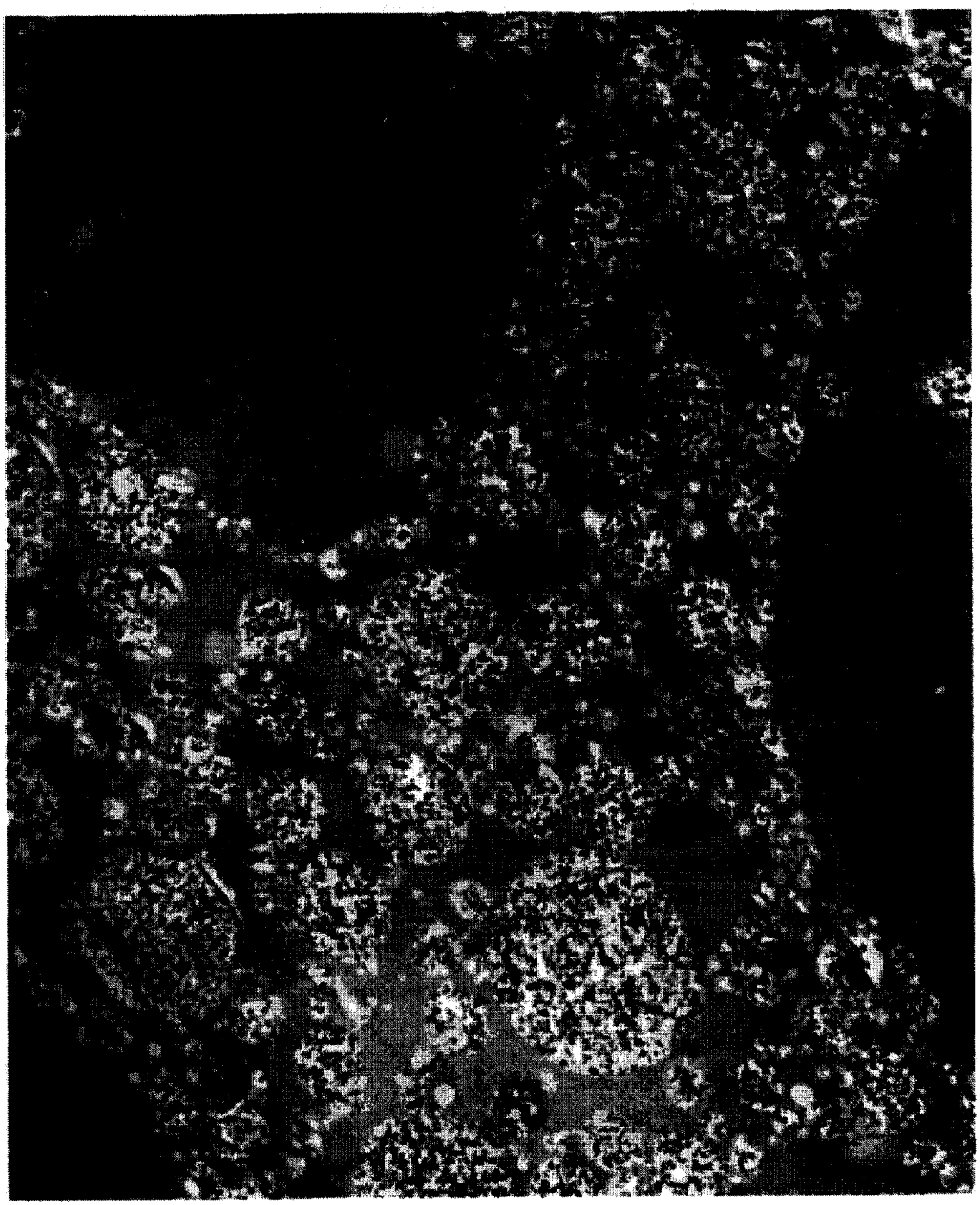
FIG. 1 is a micrograph acquired using a transmission electron microscope demonstrating a carbon black dispersion according to the present invention, as described in Example 1.

Any monomer unit traditionally used to form semisuspension polymerized conductive carrier powder can be used in the present invention to form the polymer matrix. For example, suitable monomers include, but are not limited to: monocarboxylic acids and their derivatives such as acrylic acid, methyl acrylate, ethyl acrylate, butyl acrylate, dodecyl acrylate, octyl acrylate, phenyl acrylate, methacrylic acid, methyl methacrylate, ethyl methacrylate, butyl methacrylate, octyl methacrylate, acrylonitrile and acrylamide; dicarboxylic acids having a double bond and their derivatives such as maleic acid, monobutyl maleate and dibutylmaleate; vinyl esters such as vinyl chloride, vinyl acetate and vinyl benzoate; vinyl ketones such as vinyl methyl ketone and vinyl ether ketone; vinyl ethers such as vinyl ethyl ether and vinyl isobutyl ether; vinyl naphthalene; unsaturated monoolefins such as isobutylene and the like; vinylidene halides such as vinylidene chloride and the like; N-vinyl compounds such as N-vinyl pyrrole; fluorinated monomers such as allyl pentafluorobenzene and the like; and mixtures thereof. The polymer matrix may contain more than one monomer. In a preferred embodiment, the monomer unit is methylmethacrylate.

The block copolymer comprises a polymer block (the A block) that is miscible with the above monomer and with a polymer of the above monomer. In a preferred embodiment of the present invention, the polymer block is of the same monomer as the monomer forming the polymer matrix. Use of the same monomer, or one that is miscible with the polymer matrix, provides a "brush-like" steric stabilizing structure around the carbon black particle, thereby stabilizing it in the polymer matrix.

The block copolymer also comprises a B block that anchors to the surface of the carbon black. The B block comprises monomer units that have an affinity for the surface of the carbon black such that the polymer block preferably adsorbs on the surface of the carbon black rather than being solvated in the suspension. Thus, the B block is selected based on the surface characteristics of the carbon black being used. Generally, the B block is formed from different monomers than the polymer matrix. In a preferred embodiment of the present invention, the B block is immiscible in the polymer matrix-forming monomer and in the polymer matrix formed from the monomer.

In an embodiment of the present invention, polystyrene and polystyrene derivatives may be used as B blocks since they have an affinity for many carbon blacks and are immisible in the A blocks suggested above. Polystyrene derivatives that can be used in embodiments of the present invention include, but are not limited to, polychlorostyrene, polymethylstyrene, poly(t-butylstyrene), and the like. For many carbon blacks, alternative B blocks include, but are not limited to, poly(vinyl naphthalene), poly(4-vinylpyridine) and other polymers of aromatic monomers, particularly non-polar aromatic monomers.

In the present invention, it is preferred that the block copolymer be an AB block copolymer. However, other suitable block polymers, such as triblock copolymers, may suitably be used as long as the objects of the present invention are achieved.

The block copolymer can be prepared by any known means for preparing block copolymers, for example, such as ionic polymerization or group transfer polymerization. Such processes are described in Encyclopedia of Polymer Science and Engineering, Volume 2, page 324, John Wiley and Sons, New York, 1984, the disclosure of which is totally incorporated herein by reference.

In an embodiment of the present invention, the block copolymer contains from about 70 to about 98 parts by weight of the A block and from about 2 to about 30 parts by weight of the B block per 100 parts by weight block copolymer. In a preferred embodiment, the block copolymer contains from about 80 to about 92 parts by weight of the A block and from about 8 to about 20 parts by weight of the B block per 100 parts by weight block copolymer.

In an embodiment of the present invention, the number average molecular weight of the A block is from about 5,000 to about 50,000, and preferably from about 10,000 to about 30,000. In a further embodiment of the present invention, the number average molecular weight of said B block is from about 800 to about 6,000, and preferably from about 1,200 to about 4,000.

The amount of block copolymer mixed with the polymer matrix-forming monomer is generally from about 0.1 to about 10 parts by weight per 100 parts by weight of monomer. In a preferred embodiment, the amount of block copolymer is from about 0.5 to about 5 parts by weight per 100 parts by weight of monomer.

Any of the various conductive carbon blacks known in the art may be used in the present invention. Examples of suitable carbon black include, but are not limited to, lamp black, furnace black, acetylene black (available from Chevron Chemical), VULCAN BLACK™, BLACK PEARL L®, KEYTJEN BLACK EC600JD® (available from Akzo), and CONDUCTEX SC ULTRA™ (available from Columbian Chemical).

The amount of carbon black mixed with the polymer matrix-forming monomer is generally from about 1 to about 80 parts by weight per 100 parts by weight of monomer. In a preferred embodiment, the amount of carbon black is from about 5 to about 30 parts by weight per 100 parts by weight of monomer.

The polymer matrix-forming monomer, the carbon black and the block copolymer can be mixed together in any order as long as the resultant mixture contains all three components before the polymerization initiator is added. The components may be mixed by any known process, such as by milling the components in a ball-mill for, for example, 8–15 hours.

Any of the various polymerization initiators known in the art can be used in the process of the present invention. Examples of the polymerization initiator include, but are not limited to, azo-type initiators such as 2,2'-azodimethylvaleronitrile, 2,2'-azoisobutyronitrile, azobiscyclohexanenitrile, 2-methylbutyronitrile, and the like; peroxide type initiators such as benzoyl peroxide, lauryl peroxide, 1,1-(t-butylperoxy)-3,3,5-trimethylcyclohexane, n-butyl-4,4-di-(t-butylperoxy) valerate, dicumyl peroxide, and the like; mixtures thereof and the like. Further, benzoyl peroxide is a preferred polymerization initiator because it helps to maintain the dispersion.

In a preferred embodiment of the present invention more than one polymerization initiator may be used. For example, a combination of polymerization initiators that initiate polymerization at different temperatures may be used. This enables a greater amount of the monomer to be polymerized.

The amount of polymerization initiator mixed with the monomer mixture is generally from about 0.1 to about 5 parts by weight per 100 parts by weight of monomer. In a preferred embodiment, the amount of polymerization initiator is from about 0.5 to about 2.5 parts by weight per 100 parts by weight of monomer.

In a preferred embodiment of the present invention, a crosslinking agent is added to the monomer mixture before or after the addition of the polymerization initiator. Any of the various known crosslinking agents may suitably be used. The crosslinking agent may have two or more polymerizable double bonds. Examples of suitable crosslinking agents include, but are not limited to, aromatic divinyl compounds such as divinylbenzene and divinyinapththalene; carboxylic acid esters having two double bonds such as ethylene glycol diacrylate, ethylene glycol dimethylacrylate and the like; divinyl compounds such as divinyl ether, divinyl sulfite, divinyl sulfone and the like; mixtures thereof; and the like. Among these, divinylbenzene is preferred.

The amount of crosslinking agent mixed with the monomer mixture is generally from about 0.01 to about 5 parts by weight per 100 parts by weight of monomer. In a preferred embodiment, the amount of crosslinking agent is from about 0.1 to about 1 parts by weight per 100 parts by weight of monomer.

In a further preferred embodiment of the present invention, a chain transfer agent may be added to the mixture before or after the addition of the polymerization initiator to control the molecular weight by inhibiting chain growth. Chain transfer agents that may be used in embodiments of the present invention include, but are not limited to, mercaptans such as laurylmercaptan, butylmercaptan and the like, halogenated carbons such as carbon tetrachloride or carbon tetrabromide and the like, and mixtures thereof. The chain transfer agent is preferably used in an amount of from about 0.01 to about 1 part by weight per 100 parts by weight of monomer.

After the polymerization initiator and the optional crosslinking agent and chain transfer agent are added to the monomer mixture, bulk polymerization is effected until about 5 to about 30 wt. %, preferably about 10 to about 20 wt. %, and more preferably about 10 to about 15 wt. %, of the monomer has been polymerize.

After the partial polymerization has occurred, the bulk polymerization is preferably halted, for example by decreasing the reaction temperature. The partially polymerized product is dispersed in water to form a dispersed organic phase. The amount of water used is generally 2 to 5 times the volume of the dispersed partially polymerized organic phase. The water may optionally contain a small amount of stabilizer in order to assure that the partially polymerized organic phase is adequately dispersed in the water. For example, the water may contain from about 0.1 to about 5 wt. % stabilizer.

Examples of suitable stabilizers include, but are not limited to, nonionic and ionic water-soluble polymeric stabilizers such as methyl cellulose, ethyl cellulose, hydroxypropyl cellulose, block copolymer such as PLURONIC E87™ (available from BASF), sodium salt of carboxyl methyl cellulose, polyacrylate acids, salts therefore and the like; polyvinyl alcohol, gelatins, starches, gums, alginates, zein, casein and the like; barrier stabilizers such as tricalcium phosphate, talc, barium sulfate and the like; mixtures thereof and the like. Among these, polyvinyl alcohol with a weight average molecular weight of from about 1,000 to about 10,000 is particularly preferred.

In a preferred embodiment of the present invention, an aqueous phase polymerization inhibitor, such as potassium iodide, is then added to the solution to minimize formation of emulsion polymer. A microsuspension is then formed by, for example, homogenizing the solution. The resulting dispersion is then further polymerized in suspension by heating the aforementioned microsuspension to a temperature of between 40° C. and 120° C., and more preferably between 60° C. and 90° C., for a period of 2–12 hours. During this polymerization in suspension, the reactants may be agitated with, for example, a conventional turbine agitator to obtain the conductive particles of the present invention. After the particles are formed, they may be washed and dried by, for example, diluting the polymeric solution with deionized water, centrifuging the solution, and removing the supernatant.

The conductive particles of the present invention generally have a number average particle size (average diameter) of from about 0.1 to about 5 microns. In a preferred embodiment of the present invention the particles have a number average particle size of from about 0.1 to about 1 micron. In a further preferred embodiment of the present invention, the particles have a number average particle size of from about 0.1 to about 0.5 micron. In addition, carbon black is evenly distributed among the particles and within each particle. Further, only a few of the particles, if any, do not contain carbon black.

The conductive particles of the present invention generally have a number average molecular weight (as determined by gel permeation chromatography) of from about 10,000 to about 250,000. In a preferred embodiment of the present invention the particles have a number average molecular weight of from about 20,000 to about 50,000. The conductive particles of the present invention generally have a weight average molecular weight (as determined by gel permeation chromatography) of from about 30,000 to about 2,500,000. in a preferred embodiment of the present invention the particles have a weight average molecular weight of from about 100,000 to about 1,000,000. The conductive particles of the present invention generally have a resistivity of from about 1 to about 500 ohm.cm. In a preferred embodiment of the present invention the particles have a resistivity of from about 10 to about 200 ohm.cm.

These conductive particles may be coated on carrier cores to form coated conductive carrier particles. In an embodiment of the present invention, about 100 grams of core carrier may be mixed with about one gram of the conductive particles in, for example, a Munson type mixer. The conductive particles are then fused to the surface of the core carrier using, for example, a rotary kiln furnace. Coated carrier particles formed by this process have increased conductivity compared to those formed without the block copolymer.

The process and the conductive particles of the present invention are further defined by reference to the following illustrative examples, it being understood that the invention is not limited to the materials, conditions, process parameters, etc. recited herein. All parts and percentages are by weight unless otherwise indicated.

EXAMPLE I

Methylmethacrylate monomer (200 grams) and carbon black (40 grams) are milled in a ballmill containing stainless steel grinding media for 2 hours. A poly(methyl methacrylate)-b-polystyrene block copolymer (4.0 grams) is then added to the ball mill and milling is continued for 10 hours. This block copolymer is 20 weight percent polystyrene and 80 weight percent poly(methyl methacrylate). The number average molecular weights of the polystyrene and poly(methyl methacrylate) blocks are 4,000 and 20,000 respectively. 2,2'-azobis(2,4-dimethylvaleronitrile) (3.0 grams), benzoyl peroxide (1.0 gram) and divinyl benzene crosslinking agent (0.85 gram) are then mixed into the methyl methacrylatelcarbon black/block copolymer slurry for one hour in a one liter reactor.

This mixture is bulk polymerized by heating to 45° C. until 10 weight percent of the monomer, as measured by gravimetry, is converted to polymer. The bulk polymerization is quenched by cooling the reactor. The reactor contents, hereafter referred to as the organic phase, is then poured into a 2L steel beaker, along with 600 grams of an aqueous solution of 2.5 weight percent polyvinyl alcohol having a weight average molecular weight of 3,000. The resulting mixture is homogenized for 5 minutes to produce a microsuspension of polymeric particles containing carbon black in water. Potassium iodide (5.0 grams) is then added as an aqueous phase polymerization inhibitor.

The resulting microsuspension is transferred to a one liter stainless steel reactor and the temperature is raised from 25° to 60° C. in 35 minutes where it is held for 2 hours; the temperature is then increased to 85° C. during a 2 hour period and held there for 1 hour, after which the suspension is cooled in 30 minutes to 25° C. When cooled to 25° C. the suspension polymerization is complete as measured using gas chromatography. The microsuspension product is then diluted with 1L of deionized water and centrifuged. The supernatant is discarded; the wet cake is diluted with 1L of water and again centrifuged. Again the supernatant is discarded and the wet cake is freeze dried.

Scanning electron microscope photomicrographs of the dry product show that the average particle size of the polymer product is 0.8 micron. Transmission electron microscope micrographs, as demonstrated in FIG. 1, show good carbon black dispersion in which the carbon black is uniformly dispersed within individual particles and few particles do not contain carbon black. The glass transition temperature is 110° C., as measured by DSC. The product resistivity, measured by pressing a pellet of the dry product, is 75 ohm.cm.

The resulting poly(methyl methacrylate) particles (0.9 grams) containing carbon black with block copolymer are mixed with 100 grams of core carrier with an average bead diameter of 90 microns in a Munson type mixer at room temperature. The coated materials are then fused on the surface of the carrier at 400° C. in a rotary kiln furnace. Functional evaluation of the resulting carrier in a two component development system shows that the carrier has a conductivity of $10^{-6}$ (oh m.cm)$^{-1}$.

EXAMPLE II

Polymeric particles are formed as in Example I, except that 20 grams of the carbon black and 2.0 grams of the block copolymer are used. In addition, the mixture is bulk polymerized until 13 weight percent of the monomers, as measured by gravimetry, is converted to polymer.

Scanning electron microscope photomicrographs of the dry product show that the average particle size of the polymer product is 0.7 micron. Transmission electron microscope micrographs show good carbon black dispersion in which the carbon black is uniformly dispersed within individual particles and few particles do not contain carbon black. The glass transition temperature is 109° C., as measured by DSC. The product resistivity, measured by pressing a pellet of the dry product, is 167 ohm.cm.

The resulting poly(methyl methacrylate) particles (0.9 grams) containing carbon black with block copolymer are mixed with 100 grams of core carrier with an average bead diameter of 90 microns in a Munson type mixer at room temperature. The coated materials are then fused on the surface of the carrier at 400° C. in a rotary kiln furnace. Functional evaluation of the resulting carrier in a two component development system shows that the carrier has a conductivity of $10^{-7}$ (ohm.cm)$^{-1}$.

EXAMPLE III

Polymeric particles are formed as in Example I, except that the block copolymer is 10 weight percent polystyrene and 90 weight percent poly(methyl methacrylate) and the number average molecular weights of the polystyrene and poly(methyl methacrylate) blocks are 2,000 and 18,000, respectively. In addition, the mixture is bulk polymerized until 11 weight percent of the monomer, as measured by gravimetry, is converted to polymer.

Scanning electron microscope photomicrographs of the dry product show that the average particle size of the polymer product is 0.8 micron. Transmission electron microscope micrographs show good carbon black dispersion in which the carbon black is uniformly dispersed within individual particles and few particles do not contain carbon black. The glass transition temperature is 109° C., as measured by DSC. The product resistivity, measured by pressing a pellet of the dry product, is 69 ohm.cm.

The resulting poly(methyl methacrylate) particles (0.9 grams) containing carbon black with block copolymer are mixed with 100 grams of core carrier with an average bead diameter of 90 microns in a Munson type mixer at room temperature. The coated materials are then fused on the surface of the carrier at 400° C. in a rotary kiln furnace. Functional evaluation of the resulting carrier in a two component development system shows that the carrier has a conductivity of $10^{-6}$ (ohm.cm)$^{-1}$.

COMPARATIVE EXAMPLE I

Figure 2:
FIG. 2 is a micrograph acquired using a transmission electron microscope demonstrating a carbon black dispersion that does not contain an AB block copolymer according to the present invention, as described in Comparative Example 1.

Example I is repeated except that the poly(methyl methacrylate)b-polystyrene block copolymer is not added. Scanning electron microscope photomicrographs of the dry product show that the average particle size of the polymer product is 0.9 micron. Transmission electron microscope micrographs, as demonstrated in FIG. 2, show very poor carbon black dispersion, in which many particles do not contain carbon black and the carbon black tends to be in the form of large clumps or aggregates where it is present. The glass transition temperature is 110° C., as measured by DSC. The product resistivity, measured by pressing a pellet of the dry product, is 1300 ohm.cm.

The resulting poly(methyl methacrylate) particles (0.9 grams) containing carbon black is mixed with 100 grams of core carrier with an average bead diameter of 90 microns in a Munson type mixer at room temperature. The coated materials are then fused on the surface of the carrier at 400° F. in a rotary kiln furnace. Functional evaluation of the resulting carrier in a two component development system shows that the carrier has a conductivity of $10^{-10}$ (ohm.cm)$^{-1}$, as compared to $10^{-6}$ (ohm.cm)$^{-1}$ when the block copolymer is used (Example 1).

What is claimed is:

1. A process for the preparation of conductive particles, comprising:
   (a) mixing a monomer, carbon black, and a block copolymer, wherein said block copolymer comprises an A block that is miscible with the monomer, and a B block that anchors to the surface of the carbon black;
   (b) adding a polymerization initiator to the mixture of step (a);
   (c) effecting bulk polymerization of the mixture of step (b) until about 5 to about 30 weight percent of the monomer has been polymerized;
   (d) dispersing the partially polymerized product in water; and
   (e) polymerizing the resulting dispersion.

2. The process of claim 1, wherein said A block is a polymer of said monomer.

3. The process of claim 1, wherein said monomer is selected from the group consisting of monocarboxylic acids, dicarboxylic acids, vinyl esters, vinyl ketones, vinyl ethers, vinyl naphthalene, unsaturated monoolefins, vinylidene halides, N-vinyl compounds, fluorinated monomers and derivatives thereof.

4. The process of claim 1, wherein said monomer is methyl methacrylate.

5. The process of claim 1, wherein the B block is polystyrene or a derivative of polystyrene.

6. The process of claim 1, wherein 0.1 to 10 parts by weight of said block copolymer is mixed with 100 parts by weight of said monomer.

7. The process of claim 1, wherein 0.5 to 5 parts by weight of said carbon black is mixed with 100 parts by weight of said monomer.

8. The process of claim 1, wherein the number average molecular weight of said B block is 800 to 6,000.

9. The process of claim 1, wherein the number average molecular weight of said A block is 5,000 to 50,000.

10. The process of claim 1, wherein said polymerization initiator is selected from the group consisting of azo-type initiators and peroxide type initiators.

11. The process of claim 1, further comprising adding a crosslinking agent to said mixture of step (a).

12. The process of claim 1, wherein said water in step (d) further comprises 0.1 to 5 weight % of a stabilizer.

13. The process of claim 12, wherein said stabilizer comprises polyvinyl alcohol.

14. The process of claim 1, wherein an aqueous phase inhibitor is added to the dispersion of step (d).

15. The process of claim 1, further comprising washing and drying the particles of step (e).

* * * * *